W. G. KRUSE.
CLUTCH TRANSMISSION MECHANISM.
APPLICATION FILED APR. 18, 1918.

1,304,990. Patented May 27, 1919.
2 SHEETS—SHEET 1.

INVENTOR
WILLIAM G. KRUSE
BY
Richard J. Cook
ATTORNEY

W. G. KRUSE.
CLUTCH TRANSMISSION MECHANISM.
APPLICATION FILED APR. 18, 1918.

1,304,990.

Patented May 27, 1919.
2 SHEETS—SHEET 2.

Inventor
WILLIAM G. KRUSE.
By Attorney
Richard J. Cok

UNITED STATES PATENT OFFICE.

WILLIAM G. KRUSE, OF GRAHAM, WASHINGTON.

CLUTCH TRANSMISSION MECHANISM.

1,304,990.　　　　　　　Specification of Letters Patent.　　Patented May 27, 1919.

Application filed April 18, 1918. Serial No. 229,438.

*To all whom it may concern:*

Be it known that I, WILLIAM G. KRUSE, a citizen of the United States, residing at Graham, in the county of Pierce and State of Washington, have invented a new and useful Improvement in Clutch Transmission Mechanism, of which the following is a specification.

This invention relates to improvements in clutch transmission mechanism, and more particularly to marine clutch transmission mechanism for the forward and reverse speeds, and the object of this improvement is to provide a clutch transmission mechanism wherein the forward and reverse speeds can be attained without being transmitted through gears.

A further object resides in the simplicity of construction, and the rigidity of the actuating parts, eliminating the frequency of breakage, a condition inherent in marine clutches of the gear transmission type.

Further objects will appear from the following specification, illustrated in the accompanying drawings and finally pointed out in the appended claims.

Figure 1:
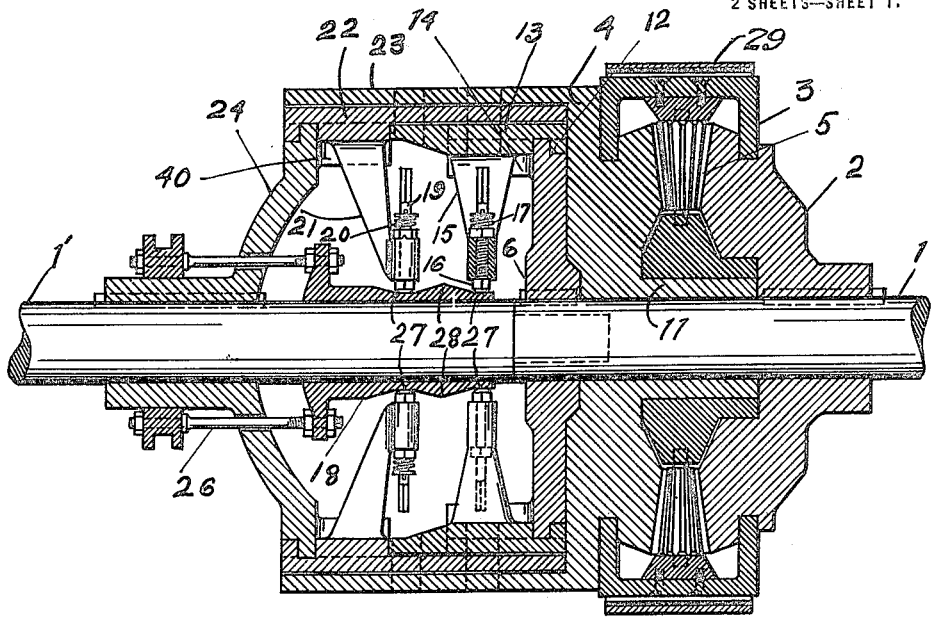
Figure 2:
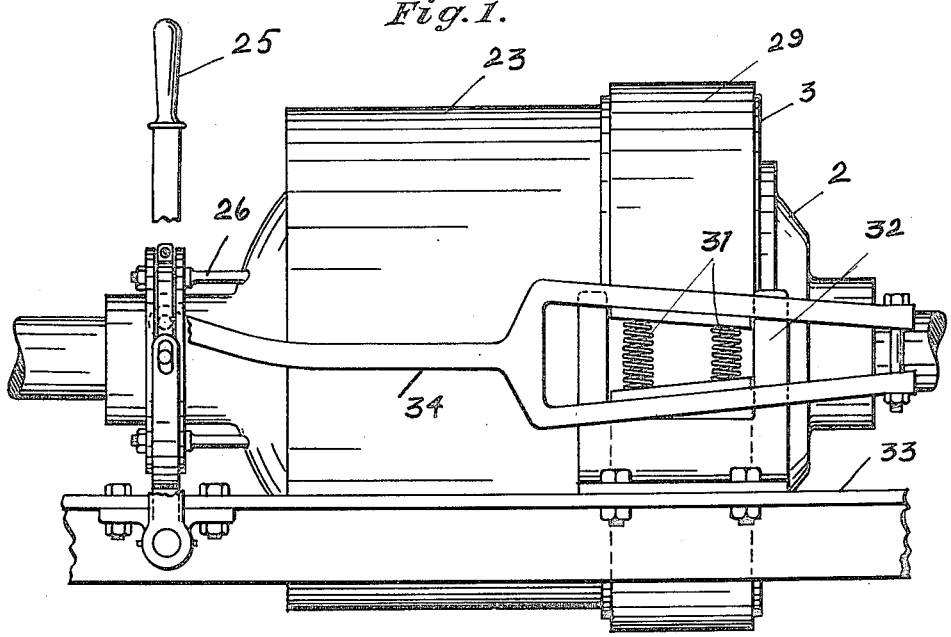
Figure 3:
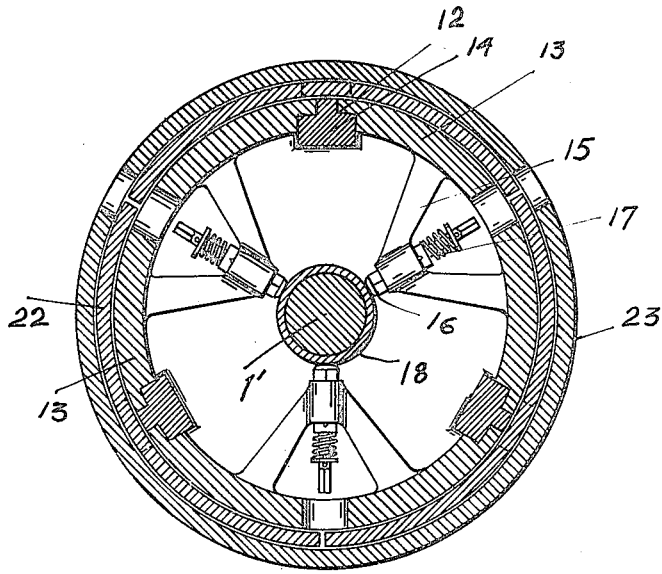
Figure 4:
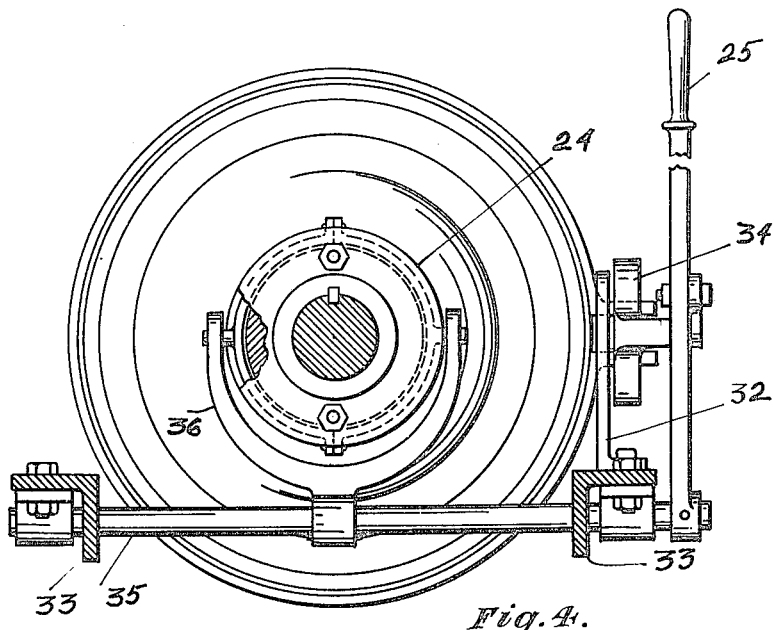

In the drawings, Figure 1 is a sectional elevation of the clutch mechanism; Fig. 2 is a side elevation of the clutch as assembled, showing the application of the mechanism for actuating the friction band thereof; Fig. 3 is a view taken along line 2—2 of Fig. 1; and Fig. 4 is an end view taken along line 3—3 of Fig. 2.

Referring more particularly to the drawings, in which like reference numerals indicate like parts, numeral 1 represents the drive shaft, preferably of a marine engine, and 1′ indicates a secondary shaft disposed in longitudinal alinement therewith and connected thereto for rotary action in the same or opposite direction. Upon the shaft 1 is provided a gear hub 2 fixedly secured thereto, and adjacent this hub is a rotatably disposed gear drum 4 adapted for axial rotation upon the shaft 1. This gear drum 4 is provided with a cylindrically shaped hub portion 11 which is adapted to form a bearing for a brake drum 3 disposed for axial rotation thereupon. 5 are a plurality of differential spider gears rotatably mounted within said brake drum 3 in circular alinement around the shaft 1 intermediate the gear hub 2 and the gear drum 4 with which they are in meshing contact. Keyed upon the end of the drive shaft 1 is a circular driving flange 6 having a recess 12 provided in its outer periphery for the reception of a plurality of outer shells 13 which are adapted to be connected therewith through male and female connection. Interposed between said shells and fixedly secured to said flange by being countersunk therein are longitudinal members 14 which are adapted to prevent peripheral displacement of said shells in their contact with said flange.

These shells are each provided with independently directed flanges 15 herein shown of V-shaped construction and having provided on their lower ends cylindrically shaped slots for the reception of yielding push bolts 16 actuated by compression springs 17.

The lower ends of these yielding push bolts are adapted to be normally in contact with a sliding sleeve 18 provided around the secondary shaft 1′, and 19 are correspondingly formed push bolts carried by flanges 21 and yieldingly actuated by compression springs 20 disposed therearound. These flanges are secured upon their upper ends to cylindrically shaped shells 22 interposed between the outer shell 23 of the gear drum 4 and the shells 13 connected to the driving flange 6. The shells 22 are connected to the flange 24 which is keyed to the secondary drive shaft 1′ through male and female connections therewith, and 40 are a plurality of longitudinal members countersunk upon said flange 24 intermediate the shells 22 for preventing peripheral displacement thereof. The sliding sleeve 18 is connected to a lever 25 through rods 26 in the usual manner, and this sleeve is disposed around the secondary shaft 1′ and extended to a point short of abutment with the face of the driving flange 6. The outer periphery of the sleeve 18 is formed with an irregular surface consisting of two depressions 27 and two elevations 28 whereby the heads of the yielding push bolts 16 and 19 can be caused to assume the two contact positions by longitudinally sliding the sleeve along the shaft.

29 is a friction clutch band provided around the periphery of the brake drum 3 and this friction clutch band has its two ends flanged in close proximity to each other and bent outwardly, upwardly and thence inwardly at a slightly converging angle.

32 is a yoke-shaped member fixedly attached to a rigid frame structure 33 having its two prongs extended upwardly on both sides of the respective ends of the friction clutch band 29 to prevent lateral displacement thereof.

34 is an elongated member formed with a yoke having converging ends that are adapted to be supported upon the respective flanged ends of the friction clutch band, and 31 are compression springs that are located intermediate of the flanged ends of the friction clutch band for sustaining the same in contact with the converging ends of the yoke-shaped member 34 and this elongated member is movable transversely said friction clutch band to effect the compression of the two ends thereof thereby causing the brake band to frictionally engage the brake drum 3 and arrest its free rotary movement upon the shaft 1. The elongated member 34 is connected to a lever 25 and this lever is fixedly secured to a transverse shaft 35 loosely mounted upon the frame 33.

36 is a yoke shifter member keyed to the shaft 35, approximately, centrally thereof and adapted to pivotally engage the hub 24 on both sides thereof, whereby pressure upon the lever 25 will actuate the elongated member 34 to have its converging ends slide longitudinally upon the converging flanged ends of the brake band 29 and thus urge the two ends into compression, or to release the compression of the two flanged ends depending upon the direction of the pressure applied to said lever. The actuation of the lever likewise urges the sleeve 18, which is connected thereto by rods 26, to slide longitudinally upon the secondary drive shaft 1', and thus actuate the engaging mechanism, the function of which is to be hereinafter described.

The operation of the clutch transmission mechanism may be described as follows: To establish forward speed from the neutral position, as herein shown, the lever 25 would be actuated to shift the sliding sleeve 18 forward longitudinally upon the secondary shaft 1' until the yielding push bolts 16 and 19 have been urged from the depressed positions 27 to rest in contact upon the elevated positions 28 of the sleeve, thereby expanding the shells 22, to which the yielding push bolt 19 is attached, to frictionally engage the inner periphery of the shell 23 of the gear drum 4 and to urge the shells 13, to which the yielding push bolt 16 is attached, to frictionally engage the inner periphery of the shells 22. The power would thus be transmitted from the drive shaft 1 through the flange 6 thereof through the interlocked shells 13, 22 and 23, by frictional contact, to the flange 24, which is keyed to the secondary drive shaft 1', actuating said secondary drive shaft 1' to rotate in the same direction as the drive shaft 1.

To pass from the neutral position to reverse, the lever 25 would be actuated to shift the sleeve 18 rearwardly upon the shaft 1' and also to cause the elongated yoke member 34 to compress the flanged ends of the friction clutch band between the converging ends of the yoke thereof whereupon the band would frictionally engage the brake drum 3 and arrest its rotary movement. The arrestation of the brake drum 3 would instantaneously set into rotation the spider gears 5, which would transmit the power to the gear drum 4 and reverse its rotation. The power would thence be transmitted from the shell 23 of the brake drum 4 to the shells 22, which being in frictional contact therewith transmit the power to the flange 24, to which they are keyed against independent rotary action, thus actuating the secondary drive shaft 1' to rotate in the reverse direction to the direction of rotation of the drive shaft 1.

It is obvious that the shells 13, are not in frictional contact with the shells 22, by reason of the fact that the rearward shifting of the sliding sleeve 18 did not effect the expansion of the yielding push bolt 16, hence the reverse rotation of the shells 13 with respect to the shells 22 would be neutral in so far as effecting the reverse action of the transmission.

While I have illustrated and described my preferred form of construction, it is to be understood that I do not care to limit myself to the details of mechanical design as herein illustrated. I am fully cognizant of the fact that various changes in the form of construction can be made to which I would be entitled, that fall within the purview of the following claims.

What I claim as new, and desire to protect by Letters Patent, is:

1. A clutch transmission comprising a drive and a driven shaft, a plurality of drums carried by said drive shaft, one of said drums adapted to be fixedly secured thereto and another of said drums adapted to be rotatably mounted thereupon and carrying mechanism to cause the same to be differentially actuated thereby, a drum adapted to be fixedly secured to said driven shaft, and a sleeve longitudinally movable upon said driven shaft for bringing said fixedly secured drums into frictional contact to establish the forward speed of said clutch transmission, and means whereupon the reversal of longitudinal movement of said sleeve upon said driven shaft will bring into frictional contact only the drum of said driven shaft with the rotatably mounted drum of said drive shaft and actuate said mechanism to differentially reverse the rotation of said rotatably mounted drum and thereby establish the reverse speed of said clutch transmission.

2. A clutch transmission comprising a drive and a driven shaft, a plurality of drums carried by said drive shaft, one of said drums adapted to be fixedly secured thereto and another of said drums adapted to be rotatably mounted thereupon, a brake drum loosely mounted upon said rotatably mounted drum and provided with a plurality of spider gears, a drum adapted to be fixedly secured to said driven shaft, and a sleeve longitudinally movable upon said driven shaft, for bringing said fixedly secured drums into frictional contact to establish the forward speed of such clutch transmission, and means engageable with said brake drum whereupon the reversal of longitudinal movement of said sleeve upon said driven shaft will bring into frictional contact only the drum of said driven shaft with the rotatably mounted drum of said drive shaft and arrest the rotation of said brake drum and thereby actuate said spider gears to reverse the rotation of said rotatably mounted drum for establishing the reverse speed of said clutch transmission.

3. A marine clutch transmission comprising a drive and a driven shaft, a plurality of drums provided on said drive shaft, one of said drums adapted to be fixedly secured thereto and another of said drums adapted to be rotatably mounted thereupon, means for reversing the rotation of the said rotatably mounted drum, a drum adapted to be fixedly secured to said driven shaft, a sleeve comprising shoulders longitudinally movable upon said driven shaft for bringing said fixedly secured drums into frictional contact to establish the forward speed of said marine clutch transmission, means adapted to actuate the reversing means of said rotatably mounted drum, whereupon the reversal of longitudinal movement of said sleeve upon said driven shaft will bring said sleeve upon said driven shaft will bring into frictional contact only the drum of said driven shaft with the rotatably mounted drum of said drive shaft and allow the fixedly secured drum of said drive shaft to rotate neutrally and thereby establish the reverse speed of said marine clutch transmission.

4. A marine clutch transmission comprising a drive and a driven shaft, a plurality of drums provided on said drive shaft, one of said drums adapted to be rotatably actuated thereby and another of said drums adapted to be rotatably mounted thereupon, a gear hub fixedly secured to said drive shaft, a brake drum loosely mounted intermediate said hub and said rotatably mounted drum and provided with a plurality of spider gears disposed in meshing contact with said hub and said rotatably mounted drum, a drum adapted to be fixedly secured to said driven shaft, a sleeve longitudinally movable upon said driven shaft and adapted to selectively actuate said drums into frictional contact, and means for actuating said sleeve and said brake drum whereupon said rotatably mounted drum would be reversed by said spider gears and would be brought into frictional contact with the drum of said driven shaft and thereby reverse the speed of said marine clutch transmission.

Signed by me at Seattle, Washington, this 30th day of March, 1918.

WILLIAM G. KRUSE.

Witnesses:
E. B. HERALD,
R. J. COOK.